US011159422B2

(12) United States Patent
Wei et al.

(10) Patent No.: US 11,159,422 B2
(45) Date of Patent: Oct. 26, 2021

(54) EVOLVED PACKET DATA CONVERGENCE PROTOCOL DUPLICATION

(71) Applicant: FG Innovation Company Limited, Tuen Mun (CN)

(72) Inventors: Chia-Hung Wei, Hsinchu (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/779,973

(22) Filed: Feb. 3, 2020

(65) Prior Publication Data

US 2020/0252330 A1    Aug. 6, 2020

Related U.S. Application Data

(60) Provisional application No. 62/800,556, filed on Feb. 3, 2019.

(51) Int. Cl.
| | | |
|---|---|---|
| *H04L 12/707* | (2013.01) | |
| *H04W 76/15* | (2018.01) | |
| *H04W 80/02* | (2009.01) | |

(52) U.S. Cl.
CPC ............ *H04L 45/24* (2013.01); *H04W 76/15* (2018.02); *H04W 80/02* (2013.01)

(58) Field of Classification Search
CPC .......... H04L 45/24; H04W 4/00; H04W 4/40; H04W 4/44; H04W 4/46; H04W 4/70; H04W 76/15; H04W 80/02
See application file for complete search history.

(56) References Cited

U.S. PATENT DOCUMENTS

| | | | | |
|---|---|---|---|---|
| 2019/0230682 A1* | 7/2019 | Tang | ................. | H04W 72/1231 |
| 2020/0186292 A1* | 6/2020 | Zou | ..................... | H04W 28/12 |
| 2020/0236033 A1* | 7/2020 | Wu | ........................ | H04W 76/15 |
| 2020/0382240 A1* | 12/2020 | Centonza | ................. | H04L 1/08 |
| 2020/0382988 A1* | 12/2020 | Zhao | ................. | H04W 28/0278 |

FOREIGN PATENT DOCUMENTS

| | | | | |
|---|---|---|---|---|
| CN | 107342851 A | 11/2017 | | |
| CN | 108282823 A | 7/2018 | | |
| CN | 108810990 A | 11/2018 | | |
| CN | 109151903 A | 1/2019 | | |
| EP | 3422622 A1 * | 1/2019 | ............ | H04L 1/20 |
| WO | 2018004278 A1 | 1/2018 | | |

* cited by examiner

*Primary Examiner* — Saad A. Waqas
(74) *Attorney, Agent, or Firm* — ScienBiziP, P.C.

(57) ABSTRACT

A method for a PDCP duplication function for a UE configured with first and second cell groups is provided. The method receives, through RRC signaling, a configuration for a PDCP entity. The configuration indicates an association between the PDCP entity and several RLC entities, each associated with one of the first and second cell groups, a first RLC entity in the RLC entities associated with the first cell group to be a primary RLC entity, and a second RLC entity in the RLC entities associated with the second cell group to be a secondary RLC entity. The method duplicates at least one of one or more PDUs, and submits the at least one and a duplicate of the at least one of the one or more PDCP PDUs to the primary RLC entity and at least another one of the plurality of the RLC entities respectively.

14 Claims, 10 Drawing Sheets

EVOLVED PACKET DATA CONVERGENCE PROTOCOL DUPLICATION

CROSS-REFERENCE TO RELATED APPLICATION(S)

The present application claims the benefit of and priority to a provisional U.S. Patent Application Ser. No. 62/800,556, filed on Feb. 3, 2019, entitled "Data Transmission on Evolved PDCP Duplication," (hereinafter referred to as "US76527 application"). The disclosure of the US76527 application is hereby incorporated fully by reference into the present application.

FIELD

The present disclosure generally relates to wireless communications, and more particularly, to data transmission on Packet Data Convergence Protocol (PDCP) duplication in the next generation wireless networks.

BACKGROUND

In order to achieve higher reliability (e.g., in data packet transmission for the Ultra Reliable Low Latency Communication (URLLC) service), a new PDCP duplication mechanism for the Radio Access Network (RAN) has been introduced by the 3rd Generation Partnership Project (3GPP) for New Radio (NR). The duplication mechanism in PDCP layer includes submitting the same PDCP Protocol Data Units (PDUs) to the lower layer (e.g., the Radio Link Control (RLC) layer) twice, once to a primary RLC entity (or bearer) and a second time to an additional RLC entity (e.g., a secondary RLC entity).

Therefore, the PDCP duplication mechanism may unnecessarily increase the number of PDU generations and transmissions (e.g., to different RLC entities) and, as a result, may reduce the overall spectral efficiency. There is a need in the art for an efficient PDCP duplication mechanism that has a proper restriction on PDU duplications when more than two duplication paths are configured on a User Equipment (UE).

SUMMARY

The present disclosure is directed to data transmission on PDCP in the next generation wireless networks.

In a first aspect of the present application, a method for a PDCP duplication function for a UE that is configured with a first cell group and a second cell group is provided. The method comprises receiving, from a base station, through radio resource control (RRC) signaling, a configuration for a PDCP entity. The configuration indicates (i) an association between the PDCP entity and a plurality of RLC entities, each associated with one of the first and second cell groups, (ii) a first RLC entity in the plurality of the RLC entities associated with the first cell group to be a primary RLC entity, and (iii) a second RLC entity in the plurality of the RLC entities associated with the second cell group to be a secondary RLC entity. The method comprises duplicating, by the PDCP entity, at least one of one or more PDCP protocol data units (PDUs); and submitting, by the PDCP entity, the at least one and a duplicate of the at least one of the one or more PDCP PDUs to the primary RLC entity and at least another one of the plurality of the RLC entities respectively.

In an implementation of the first aspect, the method further comprises deactivating the PDCP duplication, after receiving a medium access control (MAC) control element (CE) indicating to deactivate the PDCP duplication function; stopping duplicating subsequent PDCP PDUs, after the PDCP duplication function is deactivated; selecting, for each of the subsequent PDCP PDUs, one of the primary and secondary RLC entities; submitting each of the subsequent PDCP PDUs to the corresponding one of the selected one of the primary and secondary RLC entities.

In another implementation of the first aspect, the method further comprises receiving, by a MAC entity, a MAC CE comprising a plurality of fields for indicating to the PDCP entity which RLC entities in the plurality of RLC entities are active and which RLC entities are inactive while the PDCP duplication function is active, wherein the at least another one of the plurality of the RLC entities receiving the duplicated one or more PDCP PDUs is one of the RLC entities in the plurality of RLC entities that are active.

In yet another implementation of the first aspect, the UE is configured with a plurality of dedicated radio bearers (DRBs) configured with the PDCP duplication function, wherein the received MAC CE is associated with one of the plurality of DRBs.

In yet another implementation of the first aspect, the plurality of fields of the MAC CE comprises at least a first field for identifying the DRB associated with the MAC CE and at least a second field for indicating whether a corresponding RLC entity is active or inactive.

In yet another implementation of the first aspect, the MAC CE is identified by a header of a MAC subPDU, the header having a specific logical channel identification (LCID).

In yet another implementation of the first aspect, the first cell group is a master cell group (MCG) and the second cell group is a secondary cell group (SCG).

In a second aspect of the present application, a PDCP entity of a UE for having a PDCP duplication function is provided. The UE comprises one or more non-transitory computer-readable media having computer-executable instructions for the PDCP duplication function, and at least one processor coupled to the one or more non-transitory computer-readable media, and configured to execute the computer-executable instructions to receive, from a base station, through RRC signaling, a configuration for a PDCP entity. The configuration indicates: (i) an association between the PDCP entity and a plurality of RLC entities, each associated with the first and second cell groups; (ii) a first RLC entity in the plurality of the RLC entities associated with the first cell group to be a primary path; and (iii) a second RLC entity in the plurality of the RLC entities associated with the second cell group to be a secondary RLC entity. The processor is further configured to execute the computer-executable instructions to duplicate, by the PDCP entity, at least one of one or more PDCP protocol data units (PDUs); and submit, by the PDCP entity, the at least one and a duplicate of the at least one of the one or more PDCP PDUs to the primary RLC entity and at least another one of the plurality of the RLC entities respectively.

In an implementation of the second aspect, the at least one processor is further configured to execute the computer-executable instructions to deactivate the PDCP duplication, after receiving a medium access control (MAC) control element (CE) indicating to deactivate the PDCP duplication function; stop duplicating subsequent PDCP PDUs, after the PDCP duplication function is deactivated; select, for each of the subsequent PDCP PDUs, one of the primary and secondary RLC entities; and submit each of the subsequent PDCP PDUs to the corresponding one of the selected one of the primary and secondary RLC entities.

In another implementation of the second aspect, the at least one processor is further configured to execute the computer-executable instructions to receive, by a MAC CE comprising a plurality of fields for indicating to the PDCP entity which RLC entities in the plurality of RLC entities are active and which RLC entities are inactive while the PDCP duplication function is active; wherein the at least another one of the plurality of the RLC entities receiving the duplicated one or more PDCP PDUs is one of the RLC entities in the plurality of RLC entities that are active.

In yet another implementation of the second aspect, the UE is configured with a plurality of dedicated radio bearers (DRBs) configured with the PDCP duplication function, wherein the received MAC CE is associated with one of the plurality of DRBs.

In yet another implementation of the second aspect, the plurality of fields of the MAC CE comprises at least a first field for identifying the DRB associated with the MAC CE and at least a second field for indicating whether a corresponding RLC entity is active or inactive.

In yet another implementation of the second aspect, the MAC CE is identified by a MAC PDU subheader having a specific logical channel identification (LCID).

In yet another implementation of the second aspect, the first cell group is a master cell group (MCG) and the second cell group is a secondary cell group (SCG).

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
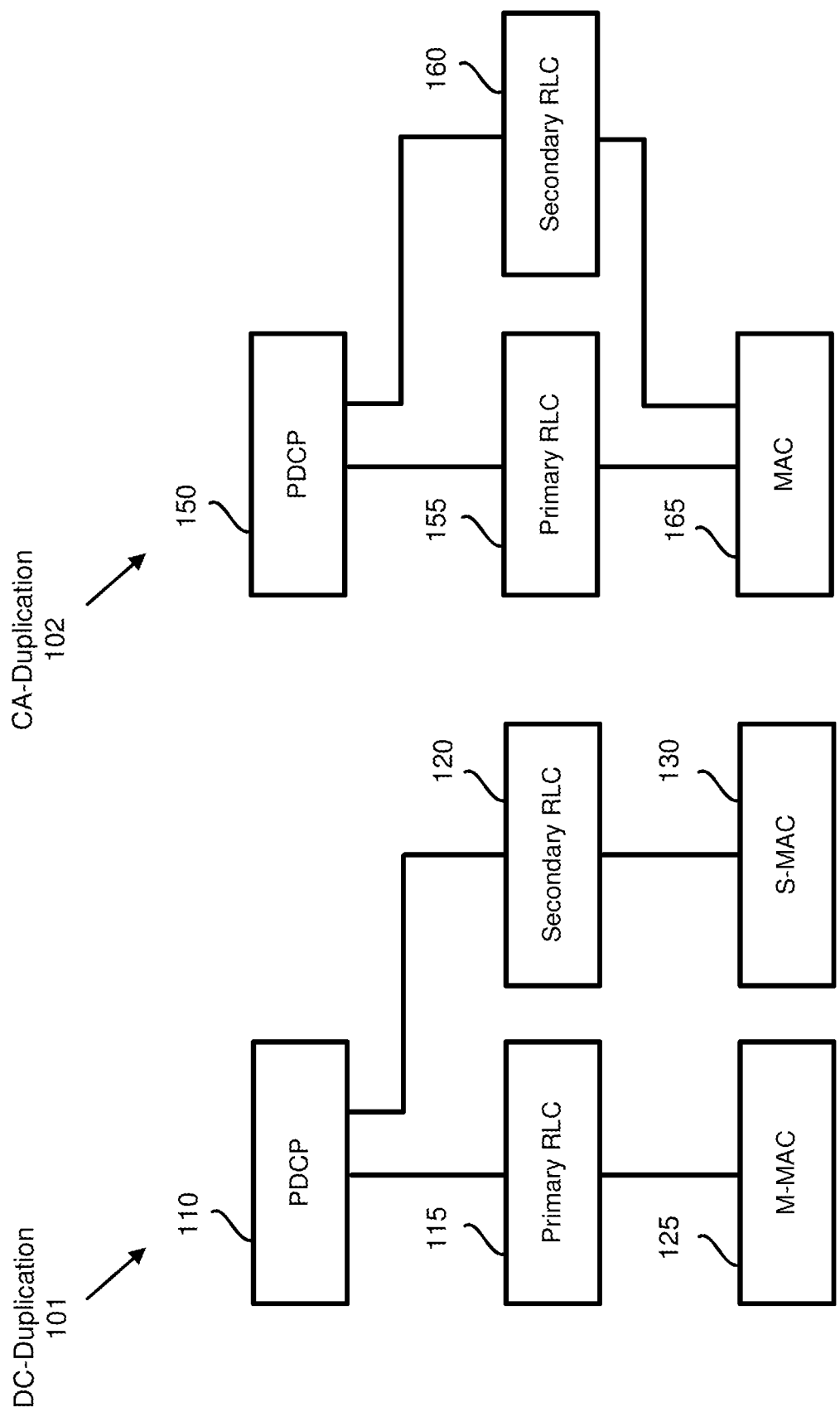
FIG. 1 is a diagram illustrating two PDCP duplication mechanisms for dual connectivity (DC) and carrier aggregation (CA) in RAN, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some of the present implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next-generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCO is a set of one or more serving cells including the Primary SCG Cell (PSCell) and zero or more secondary cells.

As also described above, the Primary Cell (PCell) may be a serving cell that belongs to MCG operating on the primary frequency, in which the UE either performs the initial connection establishment procedure or initiates the connection reestablishment procedure. In the MR-DC mode, the PCell may belong to the MN. The PSCell may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

FIG. 1 is a diagram illustrating two PDCP duplication mechanisms for dual connectivity (DC) and carrier aggregation (CA) in radio access network (RAN), according to an example implementation of the present application. As shown in FIG. 1, in a DC-Duplication 101 mechanism, when the PDCP duplication is configured (e.g., through RRC signaling) for a PDCP entity 110 associated with a radio bearer, an RLC entity (e.g., a primary RLC entity) 115, and a MAC entity e.g., a Master Cell Group-MAC (M-MAC) entity) 125, an additional RLC entity (e.g., a secondary RLC entity) 120 may be added (e.g., may be associated with the PDCP entity 110 which is configured with the PDCP duplication mechanism) in order for the radio bearer to handle the duplicated PDCP PDUs.

Similarly, in a CA-Duplication 102, when the PDCP duplication is configured for a PDCP entity 150 associated with a radio bearer, an RLC entity (e.g., a primary RLC entity) 155, and a MAC entity (e.g., a MAC entity) 165, an additional RLC entity (e.g., a secondary RLC entity) 160 may also be added (e.g., may be associated with the PDCP entity 150 which is configured with the PDCP duplication) in order for the radio bearer to handle the duplicated PDCP PDUs. It should be noted that an RLC bearer may include a lower layer part of a radio bearer, which comprises an RLC entity and an associated logical channel (LCH) to the MAC entity. An LCH between an RLC entity and a MAC entity may include a service access point associating the MAC entity to the RLC entity.

The duplication in the PDCP layer (e.g., the PDCP Duplication function) may include submitting the same PDCP PDUs to a lower layer twice, once on the primary RLC entity (bearer) 115 or 155, and a second time on the additional RLC entity (bearer) 120 or 160. In doing so, the two copies of the PDCP PDU (e.g., the original PDCP PDU and the corresponding duplicated PDCP PDU) may not be transmitted on the same carrier.

Logical channels of the two RLC bearers may either be associated with a single MAC entity (e.g., in the CA mechanism) or with different MAC entities (e.g., in the DC mechanism). The two MAC entities, in the DC mechanism, may be associated with two cells (e.g., in two cell groups). One is for the Master CG (MCG) and another is for the SCG. Hereinafter, the MAC which is associated with the MCG may be referred to as an M-MAC (e.g., the M-MAC entity 125), and the MAC which is associated with the SCG may be referred to as an S-MAC (e.g., a Secondary Cell Group-MAC (S-MAC) entity 130). The PDCP duplication in the DC mechanism and the CA mechanism may be referred to as the DC-Duplication 101 and the CA-Duplication 102, respectively.

One of the two associated RLC bearers may be configured as a primary path (e.g., the primaryPath) for the PDCP PDU transmission, and the other RLC bearer may be configured as a secondary transmission path. The RLC entities of the primary and secondary transmission paths may be referred to as the primary RLC entity 115 (or 155) and the secondary RLC entity 120 (or 160), respectively. It should be noted that, the RLC bearer associated with the MAC entity which is associated with the MCG is not restricted to be configured as the primary transmission path. The configurations of the primary transmission path and the MCG/SCG may be independently made by a base station (e.g., a gNB). The configuration received (e.g., from the base station) for a cell group may configure all the serving cell(s) to be served by the same MAC entity. Each of the RLC entities may be associated with one CC. Multiple RLC entities may belong to the same CG.

Some of the present implementations provide a PDCP duplication mechanism with more than two duplication paths. That is, rather than limiting the PDCP duplication mechanism to be either a CA-Duplication or a DC-Duplication, the frequency diversity (e.g., typically gained from the CA mechanism) and spatial diversity (e.g., typically gained from the DC mechanism) may be jointly utilized in a more flexible manner by combining the CA and DC mechanisms.

Some of the present implementations provide a PDCP duplication mechanism, referred herein as the combined-duplication mechanism, which may combine the CA and DC duplication mechanisms. Once a PDCP entity is configured with the combined-duplication, three or more RLC bearers may be configured to associate with the PDCP entity. Among the associated RLC bearers, at least two of the RLC bearers may be further configured to associate with the same MAC entity, and rest of the RLC bearers may be associated with another MAC entity. Although not shown in FIG. 1, some of the present implementations may provide a combined-duplication mechanism that has more than two MAC entities.

Figure 2:
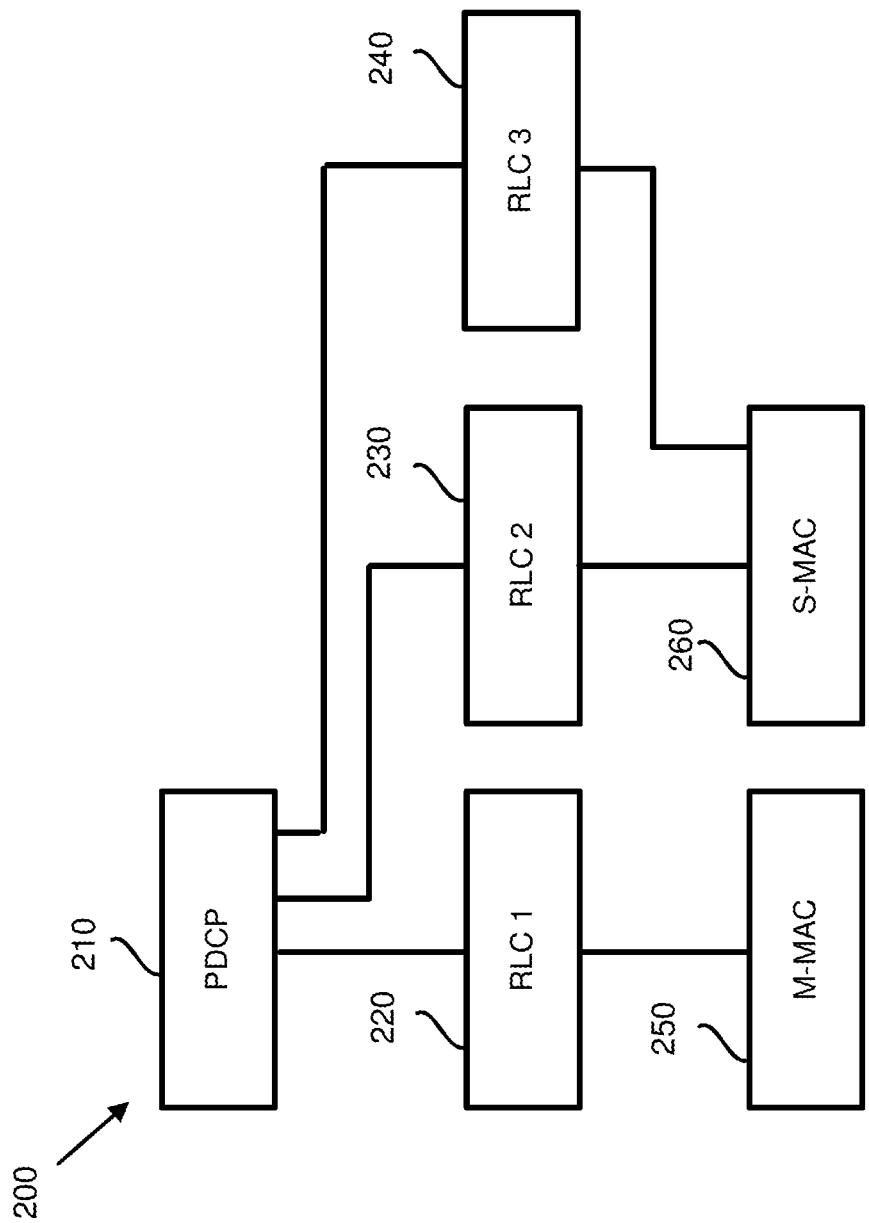
FIG. 2 is a diagram illustrating a PDCP duplication mechanism using a combined-duplication approach, according to an example implementation of the present application.

FIG. 2 is a diagram 200 illustrating a PDCP duplication mechanism using a combined-duplication approach, according to an example implementation of the present application. As shown in FIG. 2, a PDCP entity 210 may be configured with the combined-duplication and may be associated with three RLC bearers 220, 230, and 240. The RLC bearer 220 may be associated with an M-MAC entity 250, and the RLC bearers 230 and 240 may be associated with an S-MAC entity 260.

When the base station configures/reconfigures the UE's access stratum (AS) layer through a downlink RRC message, some configuration(s) related to PDCP, RLC, and MAC entities may be included in the downlink RRC message. The downlink RRC message may include one or more configuration parameters, such as the RRCReconfiguration, RRCResume, RRCReestablishment, RRCSetup (or any other downlink unicast RRC message) that contain the required PDCP duplication configuration.

The PDCP related configuration may also be contained in a PDCP (entity) specific Information Element (IE), such as the PDCP-Config parameter and the RLC bearer related configuration may be contained by an RLC bearer specific IE, such as the RLC-BearerConfig parameter. The MAC related configuration may be contained by an LCH specific IE LogicalChannelConfig.

A UE's PDCP entity may be configured with PDCP duplication by receiving the downlink RRC message transmitted by the base station. The PDCP entity may also be configured to be associated with the corresponding RLC bearer(s). In some of the present implementations, the base station may configure more than two RLC bearers to be associated with the PDCP entity. For example, the base station may configure, via three RLC-BearerConfig IEs, a total of three RLC bearers to be associated with the PDCP entity.

In order to reduce the consumption of radio resources, once the duplication function is activated, in some of the present implementations, the PDCP entity may not submit the same PDCP PDUs to all associated (e.g., the three) RLC bearers (or RLC entities). Accordingly, only a specific number (e.g., NumofCopies) (e.g., two RLC bearers), among all of the associated RLC bearers (e.g., three RLC bearers), may be adopted to transmit the same PDCP PDUs at a time.

Some of the present implementations provide mechanisms for the procedures that operate within the UE's PDCP and/or MAC entities. Examples of such procedures operated within the UE's PDCP entity may include PDCP PDU transmission, PDCP data volume calculation, and activation/deactivation of the PDCP duplication within the PDCP entity. Examples of the procedures operated within the MAC entity may include multiplexing and assembly within the MAC entity.

Some of the present implementations also provide mechanisms for the PDCP PDU transmit operation. The PDCP duplication may consume a considerable amount of radio resources for transmitting the duplicated PDCP PDUs to a lower layer (e.g., the RLC layer). Therefore, some of the present implementations may reduce radio resource consumption by allowing the PDCP entity to only submit the duplicated PDCP PDUs to a specific number of the associated RLC entities, instead of submitting the duplicated PDCP PDUs to all of the associated RLC bearers. Some of the present implementations provide methods for submitting the PDCP PDU by the PDCP entity.

Figure 3:
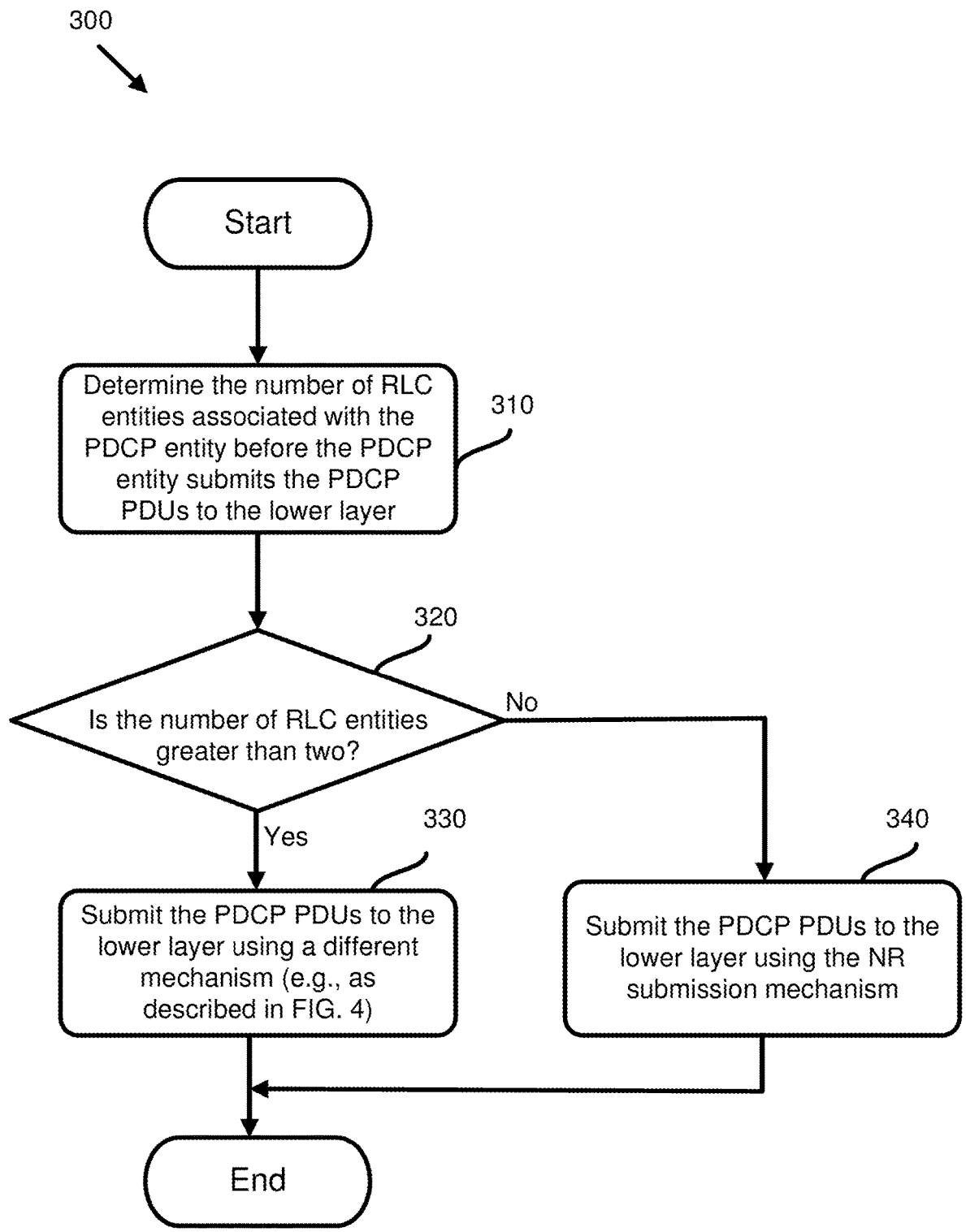
FIG. 3 is a flowchart illustrating a method (or process) performed by a UE for determining the mechanism to use for submitting the PDCP PDUs to the lower layer (e.g., one or more RLC entities), according to an example implementation of the present application.

FIG. 3 is a flowchart illustrating a method (or process) 300 performed by a UE for determining a procedure for submitting the PDCP PDUs to the lower layer, according to an example implementation of the present application. The process 300 may be performed by a controller, such as a processor and/or a microcontroller of the UE.

The process 300 may start in action 310 by determining the number of RLC entities associated with the PDCP entity before the PDCP entity submits the PDCP PDUs to the lower layer. The process 300 may determine, in action 320, whether the number of the RLC entities is greater than two.

When the process 300 determines that the number of the RLC entities is greater than two, the process 300 may submit, in action 330, the PDCP PDUs to a lower layer by using a mechanism according to some of the present implementations described below (e.g., using the transmission mode type I, the transmission mode type II, etc.) with reference to FIG. 4. The process 300 may then end.

On the other hand, when the process 300 determines that the number of the RLC entities is not greater than two, the process 300 may submit, in action 340, the PDCP PDUs to the lower layer by using the conventional NR submission mechanism. The process 300 may then end.

In some of the present implementations, all associated RLC entities configured by the base station may be implemented as activated once the corresponding RRC configuration for the DPCP duplication is configured. In some of the present implementations, except for a specific RLC entity (i.e., the default or primary RLC entity, which is indicated by the base station), all of the associated RLC entities configured by the base station may be implemented as activated once the corresponding RRC configuration for the DPCP duplication is configured and the PDCP duplication function is activated. In some of the present implementations, some of the RLC entities configured by the base station may be implemented as initially deactivated (e.g., if the data volume sent (and/or generated to be sent) to the RLC entity is already higher than a threshold). An RLC entity can be a candidate of the RLC entity selection for the PDCP PDU(s) submission by the PDCP entity, while the configured PDCP duplication may or may not be activated.

The followings provide the description of the transmission mode type I, which is done per PDCP PDU determination, according to some of the present implementations. A UE's PDCP entity may be configured with PDCP duplication based on the downlink RRC message transmitted by the base station to the UE. The PDCP entity may also be configured with the association with the corresponding RLC bearer(s). In some of the present implementations, the base station may configure more than two RLC bearers to be associated with the PDCP entity. For example, the base station may configure, via three RLC-BearerConfig IEs, a total of three RLC bearers to be associated with the PDCP entity.

In order to reduce the consumption of radio resources by the duplication function, once the duplication function is activated, in some of the present implementations, the PDCP entity may not transmit the same PDCP PDU to all of the associated (e.g., the three) RLC bearers (or RLC entities). Accordingly, only a specific number (e.g., NumofCopies) of RLC bearers (e.g., two RLC bearers), among all of the associated RLC bearers (e.g., three RLC bearers) may be adopted to transmit the copies of the PDCP PDUs.

For example, when the NumofCopies is configured as two, and the duplication function is activated, the PDCP entity may only transmit the same PDCP PDUs to two of the three RLC entities (e.g., two of all PDCP associated RLC entities). The required reliability may be achieved by submitting the PDCP PDUs to only two of the associated RLC entities (e.g., NumofCopies is configured as two), while preventing the consumption of the radio resources to linearly increase with the number of the associated RLC bearers.

In some of the present implementations, when the PDCP entity is associated with more than two RLC entities, the PDCP entity may not need to submit the PDCP PDUs to all of the associated RLC entity in the lower layer. For example, the reliability may be achieved by submitting the PDCP PDU(s) to only a limited number of the associated RLC entities. The PDCP entity should only submit the PDCP PDUs to a limited number of RLC entities (bearers) among all of the associated RLC entities by considering the total amount of the PDCP data volume and/or the RLC data volume pending for the initial transmission in the specific (e.g., in each of the selected) RLC entity(ies). The limited number, in some of the present implementations, may optionally be configured by the base station. When the limited number is not configured by the base station and the PDCP entity is associated with more than two RLC entities, the PDCP entity may submit the PDCP PDU(s) to all associated RLC entity.

Figure 4:
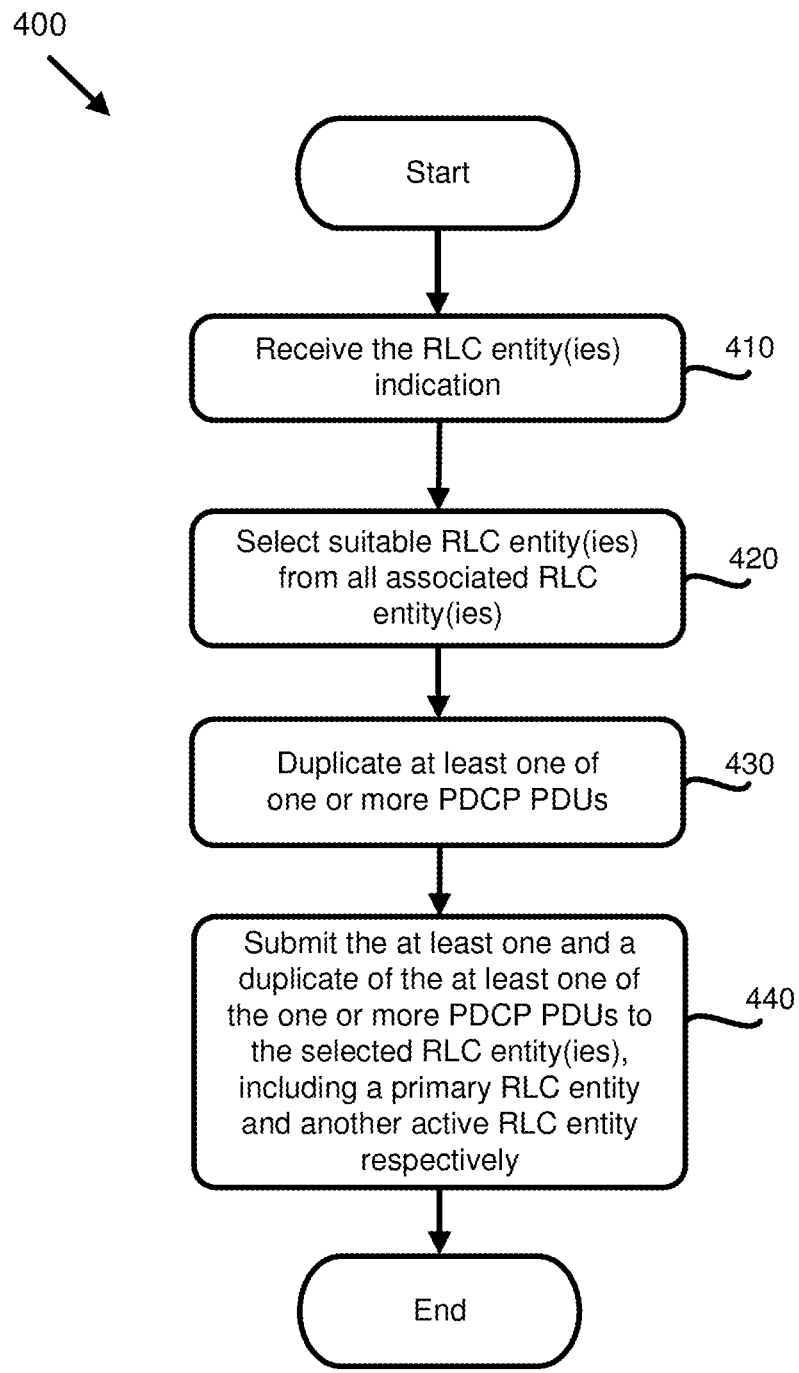
FIG. 4 is a flowchart illustrating a method (or process) performed by a UE for RLC entity selection and PDU submission schemes, according to an example implementation of the present application.

FIG. 4 is a flowchart illustrating a method (or process) 400 performed by a UE for RLC entity selection and PDU submission schemes, according to an example implementation of the present application. The process 400 may be performed by a controller, such as a processor and/or a microcontroller of the UE. The process 400 provides further details of action 330 of the process 300 described above with reference to FIG. 3.

The process 400 may start in action 410 by receiving an RLC entity indication (e.g., through downlink control messaging). The process 400 may then select, by the PDCP entity, in action 420, suitable RLC entity(ies) from all associated RLC entity(ies). Next, the process 400 may duplicate, in action 430, at least one of the PDCP PDU(s).

The process 400 may then submit, in action 440, the at least one PDCP PDU and a duplicate thereof to the selected RLC entity(ies). For example, the at least one PDCP PDU may be submitted to a primary RLC entity belonging to a primary cell group, while the duplicate of the at least one PDCP PDU may be submitted to another active RLC entity, which may belong to the primary cell group or a secondary cell group. The process 400 may then end.

It should be noted that the duplication function may not always be activated. Therefore, the PDCP entity may not always duplicate the PDCP PDUs. For example, when the duplication function is deactivated (e.g., not activated), the PDCP entity may submit the subsequent PDCP PDUs to only one RLC entity without any duplication of the PDUs, if no further behavior is specified (e.g., by the base station) when the PDCP duplication function is deactivated. Accordingly, the selected RLC entity(ies) by the PDCP entity in action 420 of the process 400 may be different depending on whether or not the PDCP duplication function is activated.

The limited number of the RLC entities, indicated above, in some of the present implementations, may be a fix number (such as 3, 4, or 5 etc.), referred herein as FN. The limited number of the RLC entities, in some aspects of the present implementations, may be a maximum number threshold (MAXN). For example, the PDCP PDU should not be submitted to more than the maximum number of the RLC entities. The limited number of the RLC entities, in some other aspects of the present implementations, may be a minimum number threshold (MINN). For example, the PDCP PDU should not be submitted to less than the minimum number of RLC entities. In yet, some other aspects of the present implementations, the base station may (pre-)define or (pre)configure the limited number of the RLC entities via a specific IE contained in a downlink RRC message before, or during, the time the PDCP duplication function is activated.

As described below, some of the present implementations may provide alternative definitions for a specific RLC entity. For example, by following the limited number restriction/rule, by considering the loading of each RLC entity, by considering the loading of the PDCP entity itself, and/or by the processing time capability of each RLC entity, the PDCP entity may select the suitable RLC entity(ies) for the PDCP PDU submission.

Several implementations of the process 400 of FIG. 4 are described below. When the PDCP entity is associated with more than two RLC entities, the PDCP entity may select the RLC entity for the PDCP PDUs submission based on how the limited number of the RLC entities is determined. For example, in some of the present implementations, the limited number of the RLC entities may be configured by the base station as FN, MAXN, MINN, or both MAXN and MINN.

In some of the present implementations, the limited number of the RLC entities may be configured as a fixed number (FN). When the limited number of the RLC entities is configured as a FN, the PDCP entity may select, among all of the associated RLC entities, FN RLC entity(ies) which contain the least amount of RLC data volume pending for the initial transmission.

The following tables show examples of how the PDCP PDU(s) may be submitted by the PDCP entity in some of the present implementations. Table 1 shows how the PDCP entity may submit the PDCP PDU to the selected RLC entity(ies). Table 2 shows how the PDCP entity may select, among all of the associated RLC entities, the RLC entity(ies) for the PDCP PDU(s) submission. Table 3 shows another alternative that combines Tables 1 and 2 into a single table. It is should be noted that, all other implementations described below which relate to the limited number of the RLC entities, may also be logically addressed within the sections shown in the table 1, 2, and/or 3.

TABLE 1

Data transfer
Transmit operation
When submitting a PDCP PDU to lower layer, the transmitting PDCP entity shall:
- if the transmitting PDCP entity is associated with one RLC entity:
  - submit the PDCP PDU to the associated RLC entity:
- else, if the transmitting PDCP entity is associated with two RLC entities:
  - if the PDCP duplication function is activated:
    - (steps not related to the present implementations)
  else, if the transmitting PDCP entity is associated with more than two RLC entities:
  - if the PDCP duplication function is activated:
    - if the PDCP PDU is a PDCP Data PDU:
      - duplicate the PDCP Data PDU and submit the PDCP Data PDU to the selected RLC entity(ies);
    - else:
      - submit the PDCP Control PDU to the primary RLC entity:
  - else:
    (steps not related to the present implementations)

TABLE 2

RLC entity selection
For the PDCP entity which duplication function is activated and is configured with FN, the transmitting PDCP entity shall:
- selects FN RLC entify(ies) with the least (fewest) amount of RLC data volume pending for initial transmission among all associated RLC entities:

TABLE 3

Data transfer
Transmit operation
When submitting a PDCP PDU to lower layer, the transmitting PDCP entity shall:
- if the transmitting PDCP entity is associated with one RLC entity:
  - submit the PDCP PDU to the associated RLC entity;
- else, if the transmitting PDCP entity is associated with two RLC entities:
  - if the PDCP duplication function is activated:
    - (steps not related to the present implementations)
  else, if the transmitting PDCP entity is associated with more than two RLC entities:
  - if the PDCP duplication function is activated:
    - if the PDCP PDU is a PDCP Data PDU (this step can be ignored/skipped):
      - duplicate the PDCP Data PDU and submit the PDCP Data PDU to FN TABLE 3-continued > RLC entity(ies) with the least (fewest) amount of RLC data volume
> pending for initial transmission among all associated RLC entities
> - else:
>   - submit the PDCP Control PDU to the primary RLC entity;
> - else:
>   (steps not related to the present implementations)

In some of the present implementations, when the limited number of the RLC entities is configured as a FN, the PDCP entity may select FN RLC entity(ies) among all associated RLC entities, if the amount of RLC data volume pending for the initial transmission in the specific RLC entity(ies) (e.g., the default RLC entity(ies) or the RLC entity(ies) configured to be selected by default) satisfies a condition (e.g., is less than, greater than, or equal to a specific threshold). The specific threshold may be configured by the base station by a specific IE via a downlink RRC message.

Before the duplication function is activated, the base station may explicitly or implicitly indicate the default transmission path(s) which may be applied by the PDCP entity once the duplication function is activated via one or more unicast RRC (re)configuration. Since all of the associated RLC entities may not be applied as the transmission path PDCP entity when the duplication function is activated, one or multiple RLC entity among all of the associated RLC entities may be indicated as the default RLC entity (e.g., as the default transmission path).

In some of the present implementations, when the limited number of the RLC entities is configured as a FN, the PDCP entity may select FN RLC entity(ies) among all of the associated RLC entities except from the specific RLC entity(ies) for which the amount of the RLC data volume pending for the initial transmission satisfies a condition (e.g., the amount is less than, greater than, or equal to a specific threshold). Examples of the specific RLC entity(ies) may include the default RLC entity(ies) or the RLC entity(ies) configured to be selected by default. The specific threshold may be configured by the base station by a specific IE via a downlink RRC message.

In some of the present implementations, when the limited number of the RLC entities is configured as a FN, the PDCP entity may select FN RLC entity(ies) among specific RLC entity(ies), if the amount of RLC data volume pending for the initial transmission in the specific RLC entity(ies) satisfies a condition (e.g., the amount is less than, greater than, or equal to a specific threshold). Examples of the specific RLC entity(ies) may include the default RLC entity(ies) or the RLC entity(ies) configured to be selected by default.

Some of the present implementations may select the RLC entity(ies) in the following order: the specific RLC entity(ies) that satisfy the condition, followed by the non-specific RLC entity(ies) that satisfy the condition, followed by the RLC entity(ies) that does not satisfy the condition. The condition may be "the amount of RLC data volume pending for initial transmission is less than, greater than, or equal to a specific threshold." The RLC entity selection order may also be implemented in combination with some of the other present implementations within this disclosure. The PDCP entity may select the RLC entity(ies) in the above-mentioned order until the value FN has been reached. The specific threshold may be configured by the base station by a specific IE via a downlink RRC message.

In some of the present implementations, when the limited number of the RLC entities is configured as a FN, the PDCP entity may select all specific RLC entity(ies), if the amount of the RLC data volume pending for initial transmission in the specific RLC entity(ies) satisfies a condition (e.g., is less than, greater than, or equal to a specific threshold). Examples of the specific RLC entity(ies) may include the default RLC entity(ies) or the RLC entity(ies) configured to be selected by default.

In some of the present implementations, when the limited number of the RLC entities is configured as a FN, among all associated RLC entities, the PDCP entity may select FN RLC entity(ies) for which the RLC data volume pending for the initial transmission satisfies a condition (e.g., is less than, greater than, or equal to a specific threshold (RLCSelectedThreshold)). The specific threshold may be configured by the base station by a specific IE via a downlink RRC message. However, if the number of RLC entities for which the RLC data volume pending for the initial transmission satisfies a condition (e.g., is less than, greater than, or equal to a specific threshold) is less than the FN, the PDCP entity may select (e.g., to achieve FN selections) the remaining RLC entity(ies) in an order of increasing or decreasing LCID value.

In some of the present implementations, when the limited number of the RLC entities is configured as a FN, among all associated RLC entities, the PDCP entity may select FN RLC entity(ies) for which the RLC data volume pending for the initial transmission satisfies a condition (e.g., is less than, greater than, or equal to a specific threshold (RLCSelectedThreshold)). The specific threshold may be (configured by the base station by a specific IE via a downlink RRC message.

It should be noted that the RLC entity selected by the PDCP entity should always include all or some of the specific RLC entity(ies). But among all of the associated RLC entities, if the number of RLC entity for which the RLC data volume pending for the initial transmission satisfies a condition (e.g., is less than, greater than, or equal to a specific threshold) is less than the FN, the PDCP entity may select (e.g., to achieve FN selections) the remaining RLC entity(ies) in an order of increasing or decreasing LCID value.

It should be noted that in all the implementation discussed above, the PDCP entity should evaluate the data volume pending for the initial transmission and should select the RLC entity on per RLC entity pair basis. During the RRC (re)configuration (e.g., the RLC bearer (re)configuration or the PDCP entity (re)configuration), the base station may pair all or part of the configured RLC entity into several RLC entity pairs.

It should also be noted that all the implementations discussed above may be implemented when the PDCP duplication function configured to the PDCP entity is activated, and the RLCSelectedThreshold parameter is applied when the duplication function is activated. Once the duplication is deactivated, the PDCP entity should apply the ul-DataSplitThreshold parameter defined in NR. Accordingly, the base station may configure both the RLCSelectedThreshold and the ul-DataSplitThreshold parameters to the UE.

In some of the present implementations, the limited number of the RLC entities may be configured as a maximum number (MAXN). When the limited number of the RLC entities is configured as a MAXN, the PDCP entity may select as many RLC entities as possible as long as the amount of the RLC data volume pending for the initial transmission in each selected RLC entity is less than (or equal to) a predefined data amount threshold (e.g., the RLCSelectedThreshold parameter or a specific threshold configured by the base station by a specific IE via a downlink RRC message) and the number of the selected RLC entities is not greater than or equal to MAXN.

The RLCSelectedThreshold parameter may be configured by the base station by a specific IE via a downlink RRC message. It should be noted that, in some of the other present implementations, the PDCP entity may select as much RLC entity as possible as long as the amount of the RLC data volume pending for the initial transmission in each of the selected RLC entity is less than or equal to a predefined data amount threshold (e.g., the RLCSelectedThreshold parameter or a specific threshold configured by the base station by a specific IE via a downlink RRC message).

In some of the present implementations, when the limited number of the RLC entities is configured as a MAXN, the PDCP entity may select as much RLC entities as possible as long as the total amount of RLC data volume pending for initial transmission in all of the selected RLC entity(ies) is not greater than or equal to the RLCSelectedThreshold parameter or a specific threshold configured by the base station by a specific IE via a downlink RRC message, and the number of selected RLC entity is not greater than or equal to MAXN.

In some of the present implementations, when the limited number of the RLC entities is configured as a MAXN, the PDCP entity may select as much RLC entity among the candidate RLC entity(ies) as possible, while the number of the selected RLC entities is not greater than or equal to MAXN. The candidate RLC entity may be the RLC entity which indicated/selected by the lower and/or the upper layer(s) and/or by a specific IE contained in a specific downlink RRC message. The indication may be based on some specific downlink reference signaling measurement or some UL measurement report (e.g., reports some specific downlink reference signaling measurement) to the base station and the base station may further indicate the candidate RLC entity to the UE.

The implementations related to the maximum number that are discussed above may further be combined with a default transmission path implementation. That is, when the condition introduced within the maximum number related implementations cannot be satisfied, the PDCP entity should select the predefined/predetermined RLC entity(ies) (e.g., the default RLC entity(ies)). The examples of the conditions may include "the amount of the RLC data volume pending for the initial transmission in each of the selected RLC entity should be less than or equal to the RLCSelectedThreshold," or "the total amount of the RLC data volume pending for the initial transmission in all selected RLC entity(ies) is not greater than or equal to the RLCSelectedThreshold." It should be noted that the base station may configure the default RLC entity per cell group.

In some of the present implementations, the limited number of the RLC entities may be configured as a minimum number (MINN). In some of the present implementations, when the limited number of the RLC entities is configured as a MINN, the PDCP entity may select at least MINN RLC entities. In addition, the amount of the RLC data volume pending for the initial transmission in each of the selected RLC entities should be less than or equal to the RLCSelectedThreshold parameter or a specific threshold configured by the base station by a specific IE via a downlink RRC message. By following this rule, if the total amount of selected RLC entities is smaller than MINN, the PDCP entity should still select MINN RLC entities and the selection may prioritize the predefined/predetermined RLC entity(ies) (e.g., the default RLC entity(ies)). It should be noted that the base station may configure the default RLC entity per cell group.

In some of the present implementations, when the limited number of the RLC entities is configured as a MINN, the PDCP entity may select at least MINN RLC entities. In addition, the total amount of the RLC data volume pending for the initial transmission in all selected RLC entities should be less than or equal to the RLCSelectedThreshold parameter or a specific threshold configured by the base station by a specific IE via a downlink RRC message. By following this rule, if the total amount of the selected RLC entities is smaller than MINN, the PDCP entity should still select MINN RLC entities and the selection may prioritize the predefined/predetermined RLC entity(ies) (e.g., the default RLC entity(ies)). It should be noted that the base station may configure the default RLC entity per cell group.

The implementations discussed above may further be implemented by combining the implementations of the maximum and minimum number. That is, the base station may configure both the MAXN and the MINN to the UE, and the conditions related to both the maximum and minimum numbers should be both satisfied by the PDCP entity while performing the RLC entity selection. For example, once "the amount of RLC data volume pending for the initial transmission in each of the RLC entities is more than the RLCSelectedThreshold," the PDCP entity should at least select MINN of RLC entity(ies). It is up to the UE implementation which RLC entity(ies) to select. As another example, when the total amount of the selected RLC entities is smaller than MINN while the total amount of RLC data volume pending for the initial transmission in all the selected RLC entities is less than (or equal to) the RLCSelectedThreshold parameter or a specific threshold configured by the base station by a specific IL via a downlink RRC message, the PDCP entity should at least select MINN of RLC entity(ies).

As another example, if the amount of RLC entity(ies) that satisfy the condition specified by RLCSelectedThreshold parameter is more than MAXN, the PDCP entity should select at most MAXN RLC entity(ies). It is up to the UE implementation to determine which RLC entity(ies) to select. By following this rule, if the total amount of selected RLC entities is less than MINN, the PDCP entity should still select MINN RLC entities and the selection may prioritize the predefined/predetermined RLC entity(ies) (e.g., the default RLC entity(ies)). It should be noted that the base station may configure the default RLC entity per cell group.

In some of the present implementations, additional alternatives that are not related to the limited number of the RLC entities may be implemented as described below. In some of the present implementations, the PDCP entity may select specific RLC entity(ies) (e.g., the default RLC entity(ies) or the RLC entity(ies) configured to be selected by default) if the amount of the RLC data volume pending for the initial transmission in the specific RLC entity(ies) satisfies a condition (e.g., is less than, greater than, or equal to a specific threshold). The specific threshold may be configured by the base station by a specific IE via a downlink RRC message.

After the RLC entity(ies) is selected, the PDCP entity may duplicate the PDCP PDU(s) (or PDCP Data PDU) and submit the PDCP PDU(s) to the selected RLC entity(ies).

It should be noted that, the specific IE mentioned above may be (PDCP-Config, moreThanOneRLC, primaryPath IE, or RLC-BearerConfig IE. The downlink RRC message may be RRCSetup, RRCResume, RRCReestablishment, or RRCReconfiguration message. It should also be noted that, the above mentioned "RLC entity" or "RLC bearer" may be logically extended to "a limited number of RLC bearer pairs." During the RRC (re)configuration (e.g., the RLC bearer (re)configuration or the PDCP entity (re)configuration), the base station may pair all or part of the configured RLC bearers into several RLC bearer pairs. Each of the implementations discussed above may be adopted to the RLC bearer pair by replacing the RLC entity with the RLC bearer pair.

Figure 5:
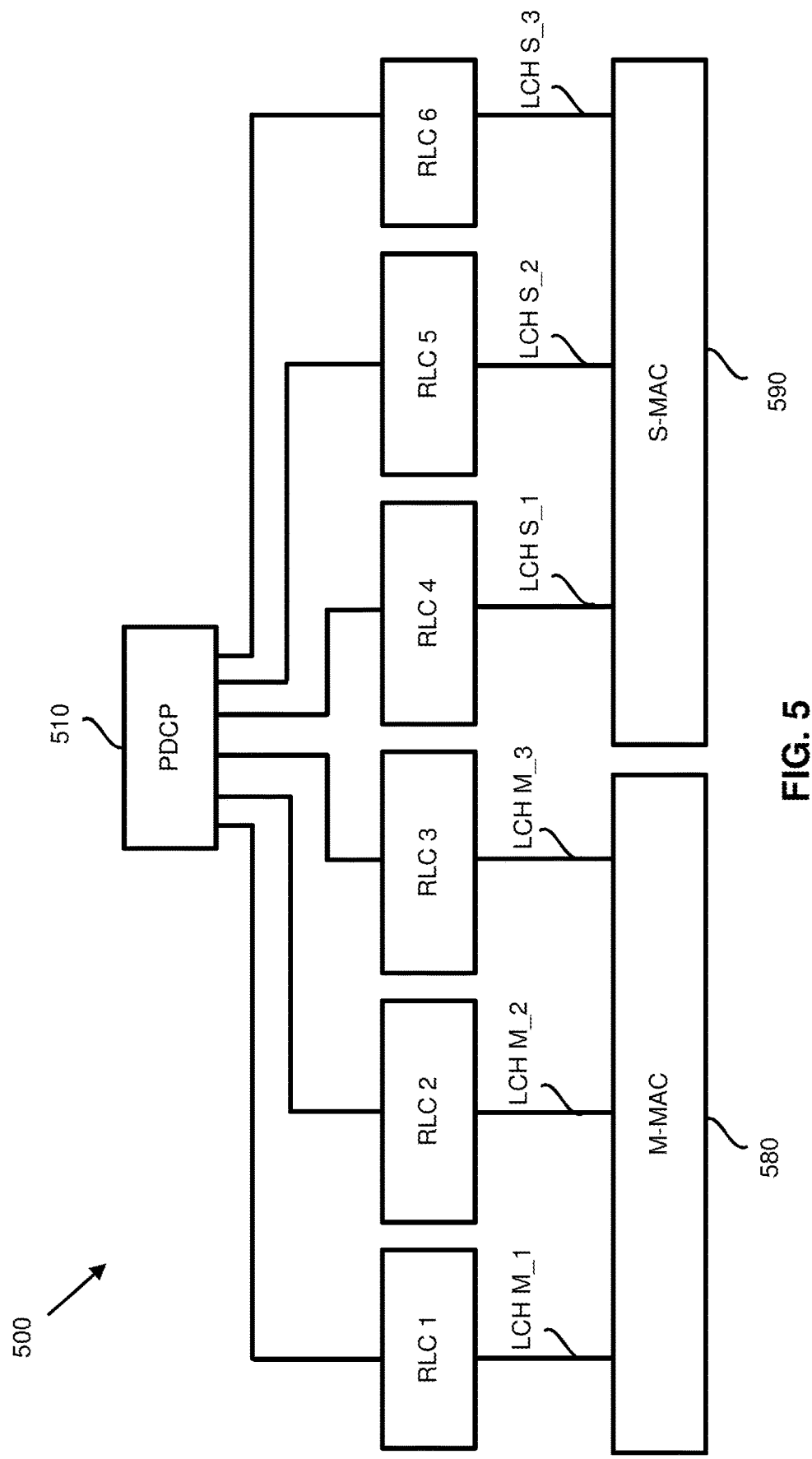
FIG. 5 is a diagram illustrating the PDCP duplication based on the RLC entities' cell group association, according to an example implementation of the present application.

Some of the present implementations may provide other alternatives which may be related to the field of Cell Group (CG). Some of these implementations, as described below, may also be jointly implemented with one or more implementations discussed above. FIG. 5 is a diagram 500 illustrating a PDCP duplication based on the RLC entities' cell group association, according to an example implementation of the present application.

As shown in FIG. 5, the PDCP entity 510 may be associated with the RLC entities 1 to 6. The PDCP entity 510 may be configured with the PDCP duplication function. The RLC entities 1, 2, and 3 may be associated with one CG (e.g., the MCG) and may by using the logical channels M_1, M_2, and M_3, respectively. On the other hand, the RLC entities 4, 5 and 6 may associated with another CG (e.g., the SCG) and may by using the logical channels S_1, S_2, and S3. The limited number of the RLC entities mentioned above may be configured by the base station (or may be pre-defined) to be adopted by the UE for only considering the RLC entity(ies) that may belong to the specific CG(s) (e.g., the MCG or the SCG).

Considering one of the implementations for the fixed number as an example, the FN may be configured to be adopted for only the specific CG(s). Among the RLC entity(ies) that belong to the specific CG, the PDCP entity may select FN RLC entity(ies) which contain the least amount of the RLC data volume pending for the initial transmission among all associated RLC entities. For example, the FN may be configured to be adopted for the SCG. Therefore, among the RLC entities 4, 5 and 6 in FIG. 5, the PDCP entity may select FN RLC entity(ies) which contain the least amount of the RLC data volume pending for the initial transmission among all associated RLC entities.

Considering one of the implementations for the maximum number as an example, the MAXN may be configured to be adopted for only the specific CG(s). Among the RLC entity(ies) that belong to the specific CG, the PDCP entity may select as many RLC entities as long as the amount of the RLC data volume pending for the initial transmission in each of the selected RLC entity is less than or equal to a predefined data amount threshold (e.g., the value of RLCSelectedThreshold parameter, or a specific threshold configured by the base station by a specific IE via a downlink RRC message), and the number the selected RLC entities is not greater than or equal to MAXN. The RLCSelectedThreshold parameter may be configured by the base station by a specific IE via a downlink RRC message. For example, the MAXN may be configured to be adopted for the SCG. Therefore, among the RLC entities 4, 5 and 6 of FIG. 5, the PDCP entity may select as much RLC entities as long as the amount of the RLC data volume pending for the initial transmission in each of the selected RLC entity is less than or equal to a predefined data mount threshold (e.g., the value of RLCSelectedThreshold parameter).

Considering one of the implementations for minimum number as an example, the MINN may be configured to be adopted for only the specific CG(s). Among the RLC entity(ies) that belong to the specific CG, the PDCP entity may select at least MINN RLC entities. In addition, the amount of the RLC data volume pending for the initial transmission in each of the selected RLC entities should be less than or equal to the value of RLCSelectedThreshold parameter or a specific threshold configured by the base station by a specific IE via a downlink RRC message. For example, the MINN may be configured to be adopted for the SCG. Therefore, among the RLC entities 4, 5 and 6 of FIG. 5, the PDCP entity may select at least MINN RLC entities. In addition, the amount of the RLC data volume pending for the initial transmission in each of the selected RLC entities should be less than or equal to the value of RLCSelectedThreshold parameter or a specific threshold configured by the base station by a specific IE via a downlink RRC message.

For each implementation described above, the RLC entity(ies) associated with the PDCP entity that belong to the specific CG may be implemented as being selected by default, or all the RLC entities associated with the PDCP entity that belong to the specific CG may be prioritized in the RLC selection by default (or when some specific condition is satisfied). In addition to the RLC entity(ies) that belong to the specific CG, one or more RLC entity(ies) associated with the PDCP entity may be implemented as being selected by following any of the above discussed implementations.

Figure 6:
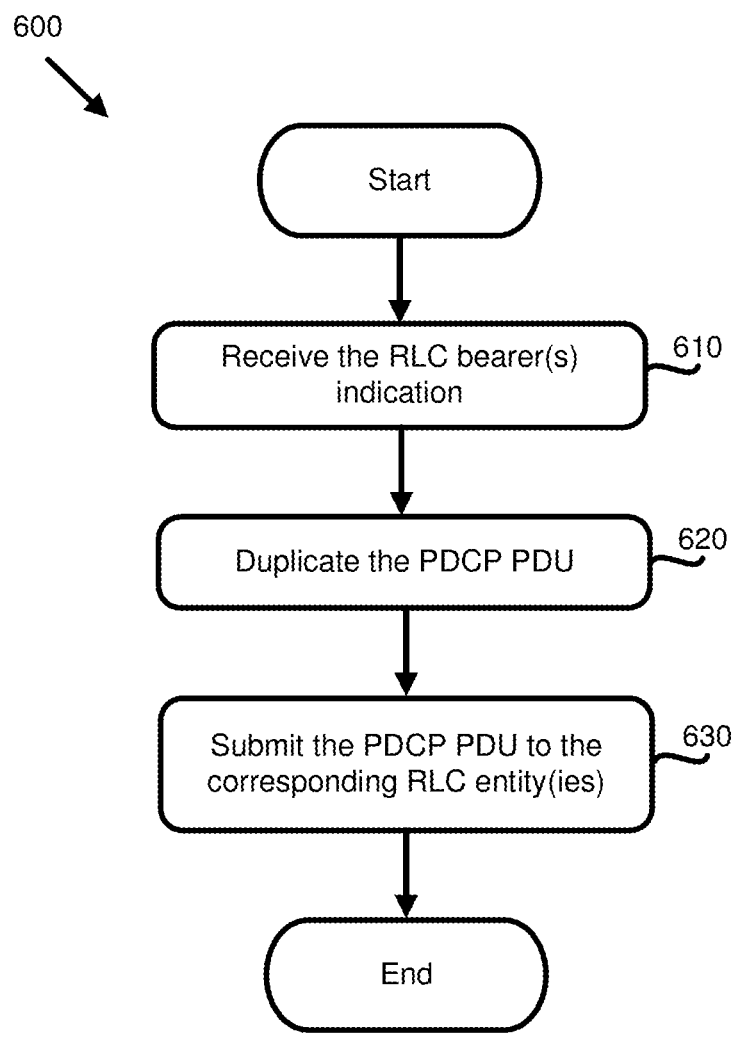
FIG. 6 is a flowchart illustrating a method (or process) performed by a UE for the PDCP PDU submission, according to an example implementation of the present application.

The followings provide the description of the transmission mode type II, where the PDCP PDU is transmitted via the indicated RLC bearers, according to some of the present implementations. In some of the present implementations, if the PDCP entity is associated with more than two RLC entities, the PDCP entity may submit the PDCP PDU to the RLC entity(ies) indicated by the lower layer, the higher layer, and/or indicated by base station via the downlink MAC control element (CE). FIG. 6 is a flowchart illustrating a method (or process) 600 performed by a UE for the PDCP PDU submission, according to an example implementation of the present application. The process 600 may be performed by a controller, such as a processor or a microcontroller of the UE.

The process 600 may start in action 610 by receiving the RLC entity(s) indication. Once the PDCP entity receives the transmission path indication from the lower layer, the PDCP entity may consider the indicated RLC entity(ies) as the current transmission path until another transmission path indication is indicated, until the PDCP duplication is deactivated, or is reconfigured by the base station. The transmission path indication may be received by the UE's MAC entity from the base station. The MAC entity should indicate the upper layer (e.g., the PDCP) transmission path(es) which may be indicated by the base station.

Next, the process 600 may duplicate, in action 620, the PDCP PDU. The process 600 may then submit, in action 630, the PDCP PDU to the corresponding RLC entity(ies). The process 600 may then end.

Figure 7:
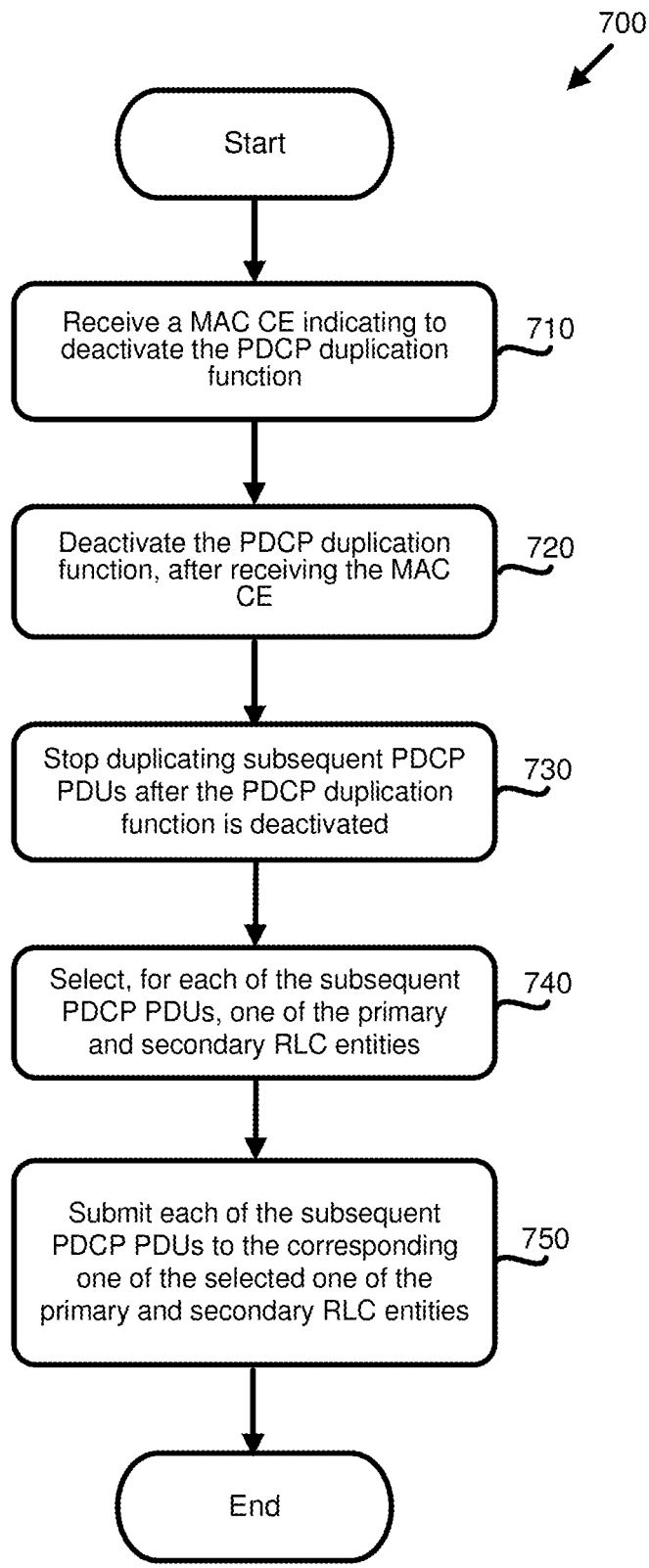
FIG. 7 is a flowchart illustrating a method (or process) for the PDCP duplication performed by a UE that is configured with a first cell group and a second cell group, according to an example implementation of the present application.

FIG. 7 is a flowchart illustrating a method (or process) 700 for the PDCP duplication performed by a UE that is configured with a first cell group and a second cell group, according to an example implementation of the present application. The process 700 may be performed by a controller, such as a processor or a microcontroller of the UE. The process 700 may start in action 710 by receiving a MAC CE from a base station, such as a gNB, indicating to deactivate the PDCP duplication function. The MAC CE may be received by the UE while the DDCP duplication function is active. The process 700, in action 720, may deactivate the PDCP duplication function, after receiving the MAC CE. The process 700, in action 730, may stop duplicating subsequent PDCP PDUs, after the PDCP duplication function is deactivated. The process 700, in action 740, may select, for each of the subsequent PDCP PDUs, one of the primary and secondary RLC entities. The process 700, in action 750, may submit each of the subsequent PDCP PDUs to the corresponding one of the selected one of the primary and secondary RLC entities.

In some of the present implementations, the PDCP entity may have a series of PDCP DPUs in a que for PDCP duplication, while the PDCP duplication function is active. When a MAC CE is received, where the MAC CE indicates to the UE to deactivate the PDCP duplication function, there may still be remaining and/or subsequent PDCP PDUs in the que that have not been duplicated or submitted to the active RLC entities. For the remaining and/or subsequent PDCP PDUs, after the PDCP duplication function is deactivated, the PDCP entity may select a single RLC entity either from RLC entities associated with a primary cell group or from RLC entities associated with a secondary cell group for submitting the remaining and/or subsequent PDCP PDUs. It should be noted that the UE may perform the RLC entity selection for each of the remaining/subsequent PDCP PDUs.

In some of the present implementations, the process 700 may further receive, by a MAC entity, a MAC CE that comprises a plurality of fields for indicating to the PDCP entity which RLC entities in the plurality of RLC entities are active and which RLC entities are inactive while the PDCP duplication function is active.

In some of the present implementations, the process 700 may further receive a MAC CE that may indicate that the PDCP duplication function is deactivated and may transmit the subsequent PDUs to only one of the first and second RLC entities. In some of the present implementations, the UE may comprise a plurality of DRBs that may be configured with the PDCP duplication function and the received MAC CE may be associated with one of the plurality of DRBs. In some of the present implementations, the plurality of fields of the MAC CE may comprise at least a first field for identifying the DRB associated with the MAC CE and at least a second field to indicate whether a corresponding RLC entity is active or inactive. In some of the present implementations, the MAC CE may be identified by a header of MAC subPDU that may have a specific LCID. In some of the present implementations, the first cell group may be an MCG and the second cell group is an SCG.

The followings provide descriptions of the multiplexing and assembly procedure be performed by a MAC entity of the UE, according to some of the present implementations. The current NR wireless communication system has introduced a cell restriction (e.g., the allowedservingcell IE) which may be independently configured by the base station to each of the configured LCHs. By applying the allowedservingcell IE, the base station may configure a set (or list) of the allowed serving cell(s) to each LCH. The UE's MAC entity may then apply the configured allowedservingcell IE during the Uplink (UL) MAC PDU transmission. In other words, once the allowedservingcell IE is configured to an LCH, the LCH should apply this cell restriction during the MAC PDU multiplexing and assembly procedure.

Figure 8:
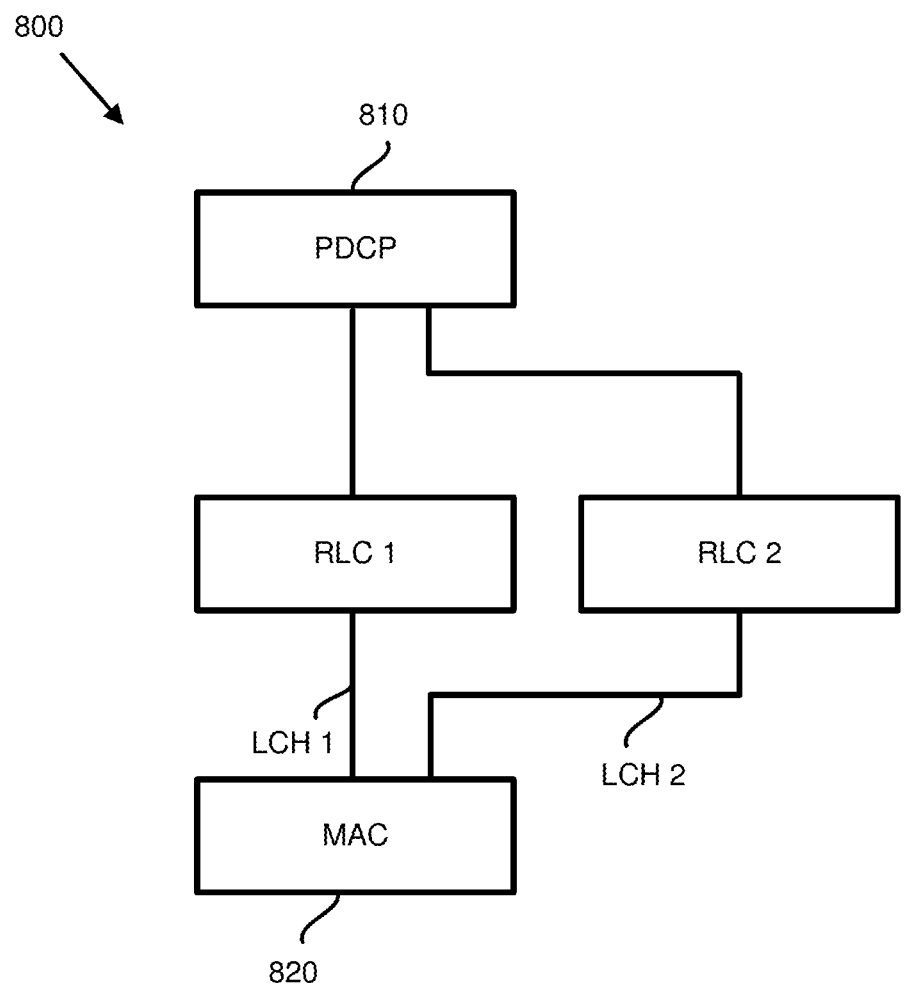
FIG. 8 is a diagram illustrating a serving cell restriction mechanism, according to an example implementation of the present application.

FIG. 8 is a diagram 800 illustrating the serving cell restriction mechanism, according to an example implementation of the present application. In the CA-Duplication mechanism, the allowedservingcell IE may be configured to both LCH 1 and LCH 2, which may be offered by the MAC entity 820 to the RLC entities 1 and 2, respectively. The two RLC entities 1 and 2 may be both associated with the PDCP entity 810, which may be configured with the PDCP duplication function.

One of the important purposes of configuring the allowedservingcell IE within the CA-Duplication scenario is to avoid the duplicated PDCP PDU(s) to be transmitted via the same serving cell during the multiplexing and assembly procedure. Therefore, the serving cell lists contained in the allowedservingcell IE configured for each of the two LCHs should be different.

Referring to FIG. 8, as an example, each of the serving cells of the MAC entity 820 may either be contained in the allowedservingcell IE of the LCH 1 or in the allowedservingcell IE of the LCH 2. In other words, the serving cell contained in the allowedservingcell IE of the LCH 1 may not be contained in the allowedservingcell IE of the LCH 2. The serving cell contained in the allowedservingcell IE of the LCH 2 may not be contained in the allowedservingcell IE of the LCH 1.

However, the purpose of configuring the allowedservingcell IE for the LCHs serving in the CA-Duplication may become meaningless once the duplication function is deactivated, since the PDCP PDU is no longer duplicated. Therefore, the MAC entity should not apply the allowedservingcell IE configured to the LCHs serving for the PDCP which configured with PDCP duplication within the same MAC entity (e.g., CA-Duplication) for which the PDCP duplication is deactivated.

Referring to FIG. 5, the PDCP entity 510 may be associated with the RLC entities 1 to 6. The LCH M_1, the LCH M_2, and the LCH M_3 may be offered by the M-MAC entity 580 to the RLC entity 1, the RLC entity 2, and the RLC entity 3, respectively. The LCH S_1, the LCH S_2, and the LCH S_3 may be offered by the S-MAC entity 590 to the RLC entity 4, the RLC entity 5, and the RLC entity 6 respectively.

In the implementations described above, since the transmission path may be dynamically switched while the duplication function is activated, some of the LCH(s) offered by the same MAC entity may temporally not be applied as transmission path while the duplication function is activated. For example, once the duplication function is activated, the PDCP entity may temporally select the RLC entities 1, 2, 3 and 4 as four transmission paths (as indicated by the base station), the allowedservingcell IE configured to the LCH M_1, the LCH M_2, and the LCH M_3 may avoid the duplicated PDCP PDU submitted to the RLC entities 1, 2 and 3 by the PDCP entity to be transmitted to the gNB via same serving cell.

However, once the transmission path is switched, for example, the transmission path switches to RLC entity(ies) 3, 4, 5 and/or 6. In this case, there is only LCH M_3 is applied to serve the duplicated PDCP PDU(s) among all LCH offered by the M-MAC. Then, the purpose of configuring allowedservingcell IE to the LCH M_3 becomes less meaningful. Hence, it is preferable to allow the LCH M_3 to temporally not apply the configured allowedservingcell IE if the LCH M_3 is the only LCH offered by the M-MAC entity 580 to be applied as the transmission path while the duplication function is activated. In another implementation, the LCH M_3 should temporarily not apply the configured allowedservingcell IE only when some other additional condition(s) is satisfied. For example, before transmission path is switched, the number of transmission path selected by the PDCP entity within the same MAC entity (e.g., M-MAC) should not be one.

Figure 9:
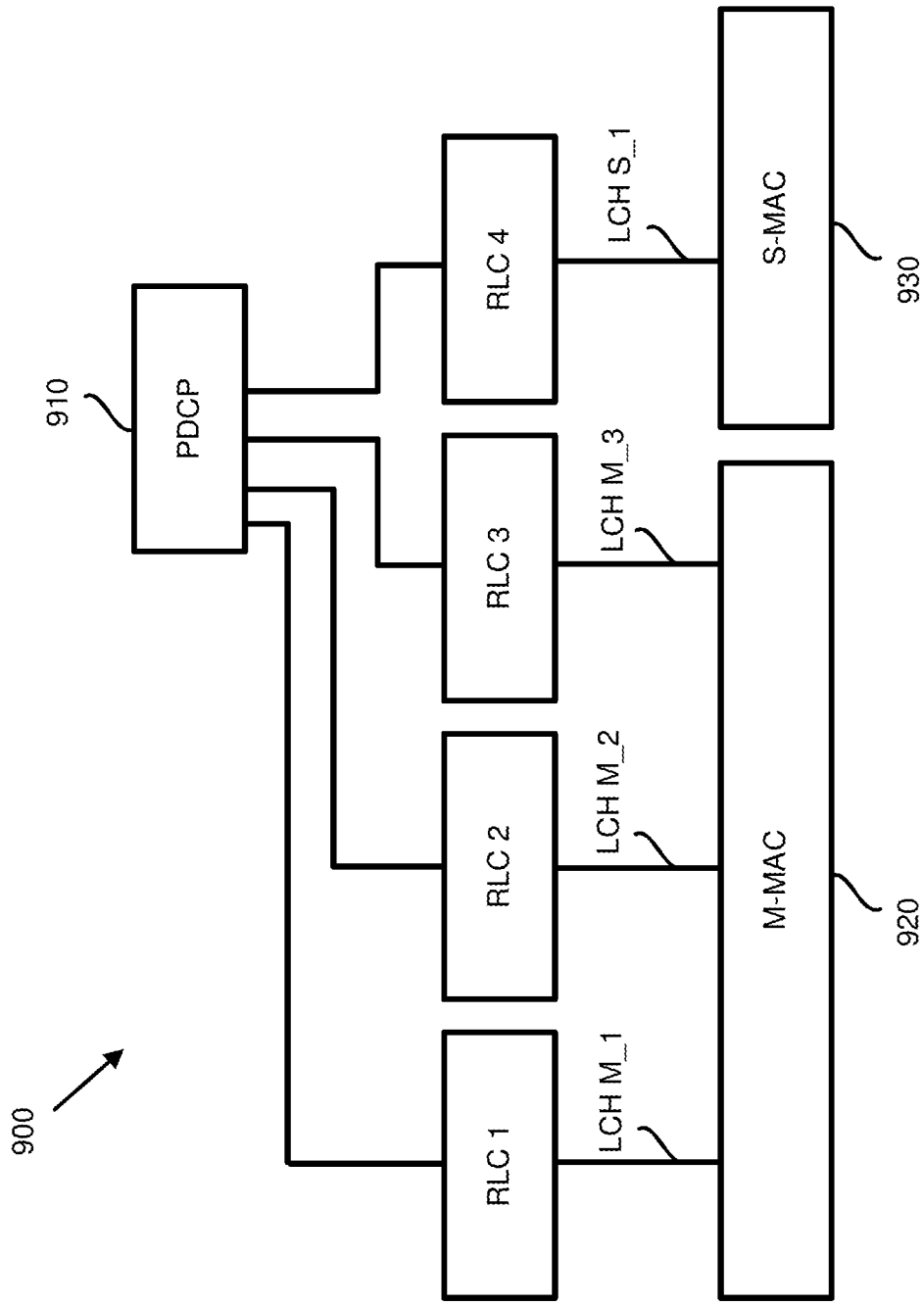
FIG. 9 is a diagram illustrating cell restriction when only one logical channel is offered by a MAC entity to an RLC entity, according to an example implementation of the present application.

The purpose of having this additional condition is to exclude the case where there is only one LCH offered by a MAC entity to an RLC entity for the PDCP duplication. FIG. 9 is a diagram 900 illustrating cell restriction when only one LCH is offered by a MAC entity to an RLC entity, according to an example implementation of the present application. As shown in FIG. 9, the PDCP entity 910 may be associated with the RLC entities 1 to 4.

The LCH M_1, the LCH M_2, and the LCH M_3 may be offered by the M-MAC entity 920 to the RLC entity 1, the RLC entity 2, and the RLC entity 3, respectively. The LCH S_1 may be offered by the S-MAC entity 930 to the RLC entity 4. It should be noted that, there is only LCH S_1 offered by the S-MAC entity 930 to serve the PDCP duplication. In this example, from the transmission paths associated with the S-MAC entity 930, the maximum number of transmission paths that may be selected by the PDCP entity 910 is one. For example, the transmission path was switched from the RLC entity LCH M_1, LCH M_3 to the RLC entity LCH M_3 and LCH S_1 which means the LCH S_1 was not switched. In this case, the configured allowedservingcell IE for the LCH S_1 may be kept applied while the allowedservingcell IE configured for the LCH M_3 may be temporally not applied. Table 4 shows the selection of the RLC entity that corresponds to the implementation described above.

only one of the two associated RLC entities. The PDCP entity may select one of the RLC entities by considering whether the two associated RLC entities belong (or associated with) the same cell group.

However, the current NR procedure may not be applied by a transmitting PDCP entity which is associated with more than two RLC entities. Once the duplication function configured to the transmitting PDCP entity, which is associated with more than two RLC entities, is not activated, the transmitting PDCP entity should check, among the all of the associated RLC entities, whether two specific RLC entities are associated with the same cell group or not. The specific RLC entities may be a primary RLC entity and a secondary RLC entity. The primary RLC entity may be an RLC entity which may be indicated via a primaryPath IE (as explained in the Technical Specification 38.331 of 3GPP) or some other IE by the base station. The secondary RLC entity may be an RLC entity which may be indicated via a SecondaryPath IE or some other IE by the base station.

In another implementation, the secondary RLC entity may be an RLC entity which may belong to a cell group which may be different than the cell group to which the primary RLC entity belongs. In other implementations, the secondary RLC entity may be implicitly determined by the logical channel identity (LCID) of the LCH associated with the RLC entity which is associated with the PDCP entity. In yet other implementations, the secondary RLC entity may be the RLC entity, among the all associated RLC entities, that is associated with an LCH with the smallest or the largest LCID. In other implementations, the secondary RLC entity may be the RLC entity, among all associated RLC entities and except the primary RLC entity, which is associated with an LCH that has the smallest or the largest LCID. In a further

TABLE 4

Selection of logical channels
The MAC entity shall, when a new transmission is performed:
  1> select the logical channels for each UL grant that satisfy all the following
     conditions:
     2> the set of allowed Subcarrier Spacing index values in allowedSCS-List, if
        configured, includes the Subcarrier Spacing index associated to the UL grant;
        and
  (conditions not related to the present implementations)
     2>allowedServingCells, if configured, includes the Cell information associated
        with the UL grant. Does not apply to logical channels associated with a DRB
        configured with PDCP duplication within the same MAC entity (e.g., CA
        duplication) for which PDCP duplication is deactivated, and also does not
        apply to a logical channel when:
          - more than one logical channel is associated with a DRB configured
            with PDCP duplication within the same MAC entity; and
          - only the RLC entity that the logical channel belongs to is selected as a
            transmission path by upper layers when PDCP duplication function is
            activated;

It should be noted that all the implementations introduced within this disclosure may be applied by a PDCP entity, which may be associated with dedicated radio bearer (DRB) or signaling radio bearer (SRB), configured with PDCP duplication. That is, the DRBs mentioned above may be replaced by an SRB.

The followings provide the description of the PDCP PDU transmit operation while the duplication is not activated, according to some of the present implementations. In the current NR duplication mechanism, a transmitting PDCP entity (e.g., the PDCP entity which submits duplicated PDCP PDU to the lower layers) may be associated with two RLC entities. Once the duplication function, configured to the PDCP entity, is not activated (e.g., is deactivated), the transmitting PDCP entity may submit the PDCP PDU(s) to implementation, among the RLC entities that belong to the cell group which is not the same as the cell group of the primary RLC entity, the secondary RLC entity may be the RLC entity which may be associated with an LCH that has the smallest or the largest LCID.

The followings provide descriptions of discarding duplicated PDU(s), according to some of the present implementations. In the current NR PDCP duplication mechanism, a transmitting PDCP entity (e.g., the PDCP entity which submits duplicated PDCP PDU to lower layers) may be associated with two RLC entities, and the transmitting PDCP entity may indicate one of the two RLC entities to discard a PDCP PDU if the PDCP PDU is indicated as successfully delivered by the other RLC entity. The successfully delivered PDCP PDU may mean that the transmitted PDCP PDU was successfully received by the receiver, and the corresponding PDCP PDU acknowledgment was received by the transmitting PDCP entity. However, the current NR procedure cannot be applied by a transmitting PDCP entity which is associated with more than two RLC entities. For the PDCP entity which is associated with more than two RLC entities (or is indicated by the base station with a specific IL contained in a downlink RRC message), once the PDCP entity has received a PDCP PDU corresponding acknowledgment from one of the associated RLC entities, the PDCP entity may indicate all other RLC entity(ies) (besides the RLC entity which received the PDCP PDU corresponding acknowledgment) to discard the duplicated PDCP Data PDU.

In some of the present implementations, once the duplication is deactivated, among all associated RLC entities, the PDCP entity may indicate some specific RLC entities to discard the duplicated PDCP Data PDU(s). The specific RLC entity may be, besides the primary RLC entity, all the associated RLC entities. The primary RLC entity may be an RLC entity which may be indicated via a primaryPath IE (as explained in the Technical Specification 38.331 of 3GPP) or some other IE by the base station.

In some of the present implementations, the specific RLC entity may be all of the associated RLC entities, except the RLC entity which is served with a specific CG (e.g., the MCG or the SCG) or a specific MAC entity (e.g., a MAC entity which is configured with the Primary serving cell). It should be noted that, the RLC entity mentioned above may also be limited to the RLC entity, which is configured by the base station, as acknowledgment mode (AM mode). Tables 5 and 6 below show the implementations introduced above for the duplicate PDU discard.

TABLE 5

Duplicate PDU discard
For the PDCP entity configured with pdcp-Duplication and the PDCP entity is associate with more than two (AM) RLC entities, the transmitting PDCP entity shall:
 - if the successful delivery of a PDCP Data PDU is confirmed by one of the associated (AM) RLC entities:
   - indicate to all other (AM) RLC entities to discard the duplicated PDCP Data PDU;

TABLE 6

Duplicate PDU discard
For the PDCP entity configured with pdcp-Duplication and the PDCP entity is associate with more than two (AM) RLC entities, the transmitting PDCP entity shall:
 - if the deactivation of PDCP duplication is indicated:
   - indicate to all RLC entities, except the primary RLC entity, to discard all duplicated PDCP Data PDUs.

Figure 10:
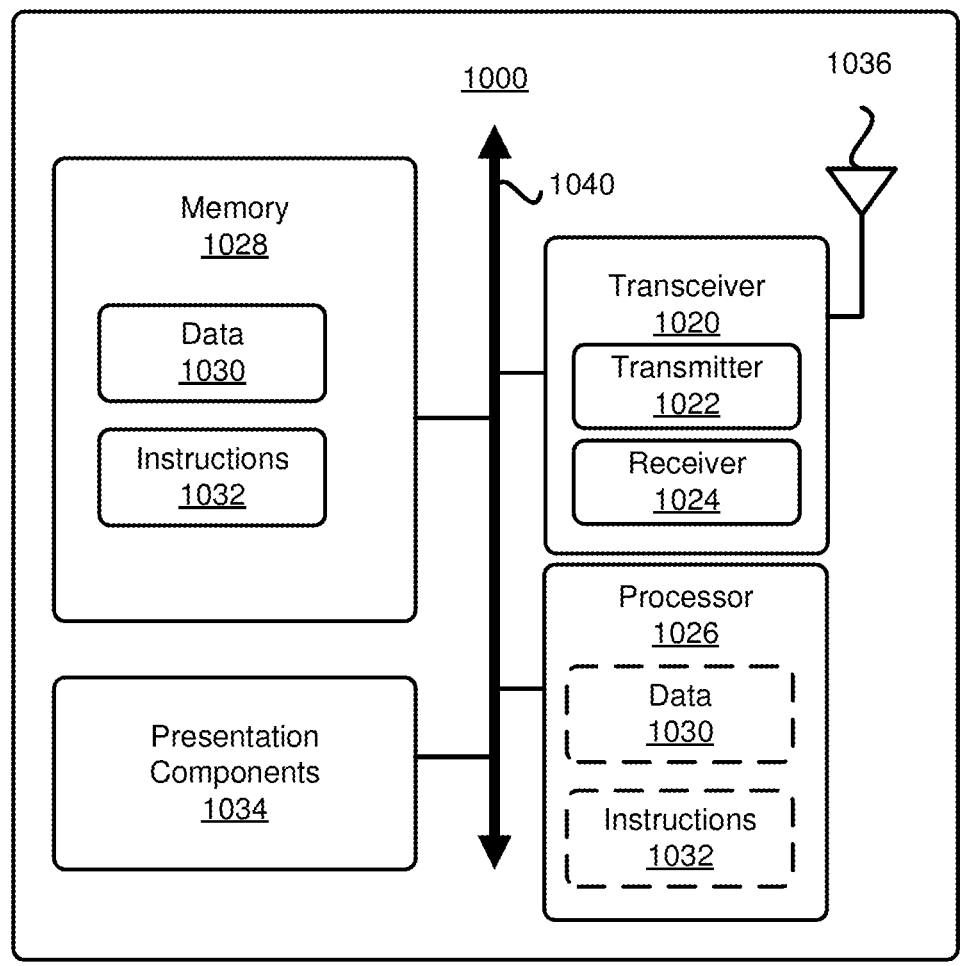
FIG. 10 illustrates a block diagram of a node for wireless communication, according to an example implementation of the present application.

FIG. 10 illustrates a block diagram of a node for wireless communication, according to an example implementation of the present application. As shown in FIG. 10, node 1000 may include transceiver 1020, processor 1026, memory 1028, one or more presentation components 1034, and at least one antenna 1036. Node 1000 may also include a Radio Frequency (RF) spectrum band module, a base station communications module, a network communications module, and a system communications management module, input/output (I/O) ports, I/O components, and power supply (not explicitly shown in FIG. 10). Each of these components may be in communication with each other, directly or indirectly, over one or more buses 1040.

Transceiver 1020 having transmitter 1022 and receiver 1024 may be configured to transmit and/or receive time and/or frequency resource partitioning information. In some implementations, transceiver 1020 may be configured to transmit in different types of subframes and slots including, but not limited to, usable, non-usable and flexibly usable subframes and slot formats. Transceiver 1020 may be configured to receive data and control signalings.

Node 1000 may include a variety of computer-readable media. Computer-readable media can be any available media that can be accessed by node 1000 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 1028 may include computer-storage media in the form of volatile and/or non-volatile memory. Memory 1028 may be removable, non-removable, or a combination thereof. Exemplary memory includes solid-state memory, hard drives, optical-disc drives, and etc. As illustrated in FIG. 10, memory 1028 may store computer-readable, computer-executable instructions 1032 (e.g., software codes) that are configured to, when executed, cause processor 1026 to perform various functions described herein, for example, with reference to FIGS. 1 through 10. Alternatively, instructions 1032 may not be directly executable by processor 1026 but be configured to cause node 1000 (e.g., when compiled and executed) to perform various functions described herein.

Processor 1026 may include an intelligent hardware device, for example, a central processing unit (CPU), a microcontroller, an ASIC, and etc. Processor 1026 may include memory. Processor 1026 may process data 1030 and instructions 1032 received from memory 1028, and information through transceiver 1020, the base band communications module, and/or the network communications module. Processor 1026 may also process information to be sent to transceiver 1020 for transmission through antenna 1036, to the network communications module for transmission to a core network.

One or more presentation components 1034 presents data indications to a person or other device. For example, one or more presentation components 1034 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a packet data convergence protocol (PDCP) duplication function for a user equipment (UE) that is configured with a first cell group and a second cell group, the method comprising:
   receiving, from a base station, through radio resource control (RRC) signaling, a configuration for a PDCP entity, the configuration indicating:
   (i) an association between the PDCP entity and a plurality of radio link control (RLC) entities, each RLC entity associated with one of the first and second cell groups, wherein the plurality of RLC entities comprises at least three RLC entities;
   (ii) a first RLC entity in the plurality of RLC entities associated with the first cell group to be a primary RLC entity; and
   (iii) a second RLC entity in the plurality of RLC entities associated with the second cell group to be a secondary RLC entity;
   duplicating, by the PDCP entity, at least one of one or more PDCP protocol data units (PDUs); and
   submitting, by the PDCP entity, the at least one and a duplicate of the at least one of the one or more PDCP PDUs to the primary RLC entity and at least another one of the plurality of RLC entities respectively, wherein:
   a first subset of the plurality of RLC entities comprises one or more RLC entities indicated as active while a second subset of the plurality of RLC entities comprises one or more RLC entities indicated as inactive, and
   the at least another one of the plurality of RLC entities receiving the duplicated one or more PDCP PDUs is an RLC entity in the first subset of the plurality of RLC entities.

2. The method of claim 1 further comprising:
   deactivating the PDCP duplication function, after receiving a medium access control (MAC) control element (CE) indicating to deactivate the PDCP duplication function;
   stopping duplicating subsequent PDCP PDUs, after the PDCP duplication function is deactivated;
   selecting, for each of the subsequent PDCP PDUs, one of the primary and secondary RLC entities; and
   submitting each of the subsequent PDCP PDUs to the corresponding one of the selected one of the primary and secondary RLC entities.

3. The method of claim 1 further comprising receiving, by a medium access control (MAC) entity, a MAC control element (CE) comprising a plurality of fields for indicating to the PDCP entity which RLC entities are in the first subset of the plurality of RLC entities and which RLC entities are in the second subset of the plurality of RLC entities, while the PDCP duplication function is active.

4. The method of claim 3, wherein the UE is configured with a plurality of dedicated radio bearers (DRBs) configured with the PDCP duplication function, wherein the received MAC CE is associated with one of the plurality of DRBs.

5. The method of claim 4, wherein the plurality of fields of the MAC CE comprises at least a first field for identifying the DRB associated with the MAC CE and at least a second field for indicating whether a corresponding RLC entity is active or inactive.

6. The method of claim 3, wherein the MAC CE is identified by a header of a MAC subPDU, the header having a specific logical channel identification (LCID).

7. The method of claim 1, wherein the first cell group is a master cell group (MCG) and the second cell group is a secondary cell group (SCG).

8. A user equipment (UE) comprising:
   one or more non-transitory computer-readable media having computer-executable instructions for a packet data convergence protocol (PDCP) duplication function for a PDCP entity of the UE; and
   at least one processor coupled to the one or more non-transitory computer-readable media, and configured to execute the computer-executable instructions to:
   receive, from a base station, through radio resource control (RRC) signaling, a configuration for the PDCP entity, the configuration indicating:
   (i) an association between the PDCP entity and a plurality of radio link control (RLC) entities, each RLC entity associated with one of the first and second cell groups, wherein the plurality of RLC entities comprises at least three RLC entities;
   (ii) a first RLC entity in the plurality of RLC entities associated with the first cell group to be a primary path; and
   (iii) a second RLC entity in the plurality of RLC entities associated with the second cell group to be a secondary path;
   duplicate, by the PDCP entity, at least one of one or more PDCP protocol data units (PDUs); and
   submit, by the PDCP entity, the at least one and a duplicate of the at least one of the one or more PDCP PDUs to the primary RLC entity and at least another one of the plurality of RLC entities respectively, wherein:
   a first subset of the plurality of RLC entities comprises one or more RLC entities indicated as active while a second subset of the plurality of RLC entities comprises one or more RLC entities indicated as inactive, and
   the at least another one of the plurality of RLC entities receiving the duplicated one or more PDCP PDUs is an RLC entity in the first subset of the plurality of RLC entities.

9. The UE of claim 8, wherein the at least one processor is further configured to execute the computer-executable instructions to:
   deactivate the PDCP duplication function, after receiving a medium access control (MAC) control element (CE) indicating to deactivate the PDCP duplication function;
   stop duplicating subsequent PDCP PDUs, after the PDCP duplication function is deactivated;
   select, for each of the subsequent PDCP PDUs, one of the primary and secondary RLC entities; and submit each of the subsequent PDCP PDUs to the corresponding one of the selected one of the primary and secondary RLC entities.

10. The UE of claim 8, wherein the at least one processor is further configured to execute the computer-executable instructions to receive, by a medium access control (MAC) entity, a MAC control element (CE) comprising a plurality of fields for indicating to the PDCP entity which RLC entities are in the first subset of the plurality of RLC entities and which RLC entities are in the second subset of the plurality of RLC entities, while the PDCP duplication function is active.

11. The UE of claim 10, wherein the UE is configured with a plurality of dedicated radio bearers (DRBs) configured with the PDCP duplication function, wherein the received MAC CE is associated with one of the plurality of DRBs.

12. The UE of claim 11, wherein the plurality of fields of the MAC CE comprises at least a first field for identifying the DRB associated with the MAC CE and at least a second field for indicating whether a corresponding RLC entity is active or inactive.

13. The UE of claim 10, wherein the MAC CE is identified by a header of a MAC subPDU, the header having a specific logical channel identification (LCID).

14. The UE of claim 8, wherein the first cell group is a master cell group (MCG) and the second cell group is a secondary cell group (SCG).

* * * * *